R. R. McDONNELL.
AUTOMOBILE DIRECTION INDICATOR.
APPLICATION FILED AUG. 5, 1918.
1,299,976.
Patented Apr. 8, 1919.
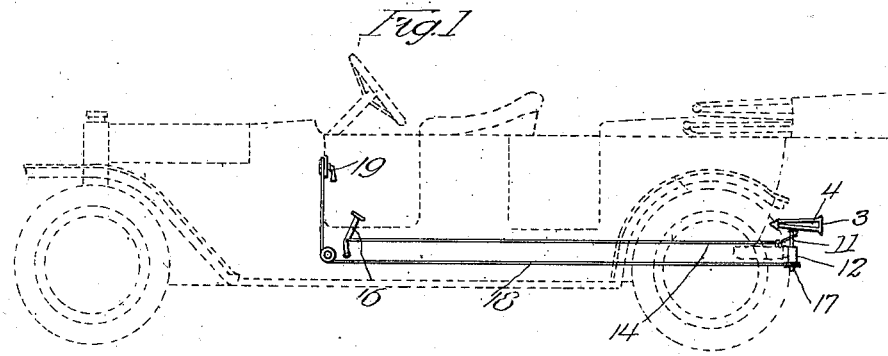
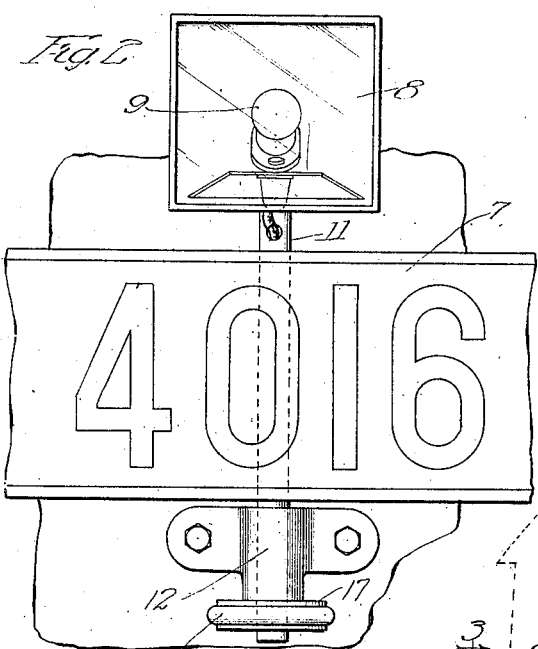
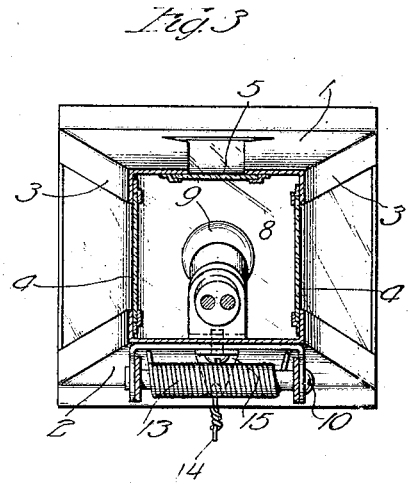
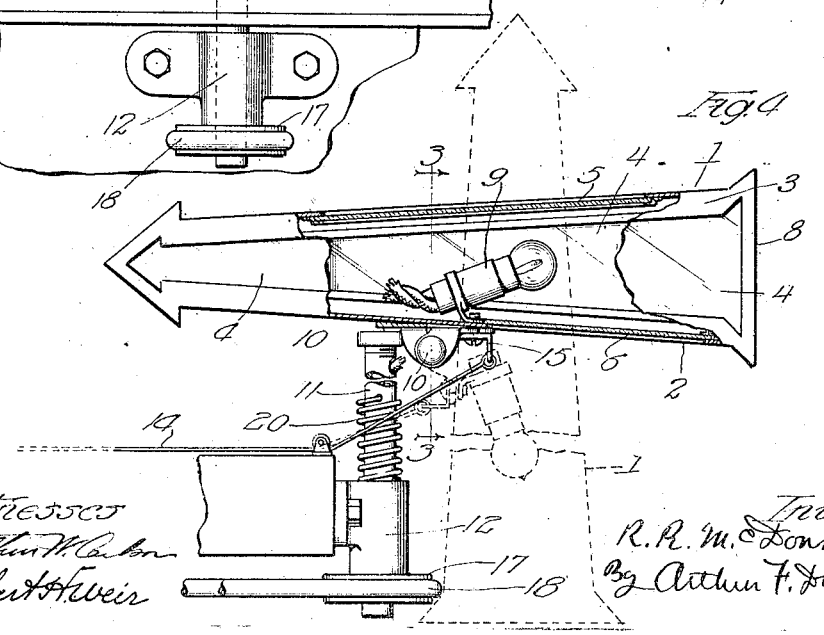

UNITED STATES PATENT OFFICE.

RALPH RAYMOND McDONNELL, OF CHICAGO, ILLINOIS.

AUTOMOBILE DIRECTION-INDICATOR.

1,299,976.  Specification of Letters Patent.  Patented Apr. 8, 1919.

Application filed August 5, 1918. Serial No. 248,299.

*To all whom it may concern:*

Be it known that I, RALPH RAYMOND McDONNELL, a citizen of the United States of America, and resident of Chicago, Illinois, have invented a certain new and useful Improvement in Automobile Direction-Indicators, of which the following is a specification.

This invention relates to devices for indicating the direction of travel of automobiles or other vehicles, so that those behind will know which way the automobile or vehicle is going to turn, or whether it is going to stop or continue traveling straight ahead.

Generally stated, the object of the invention is to provide a novel and improved construction whereby a single element, preferably in the form of a hollow body having the general shape of an arrow, is sufficient not only to indicate the direction of travel, as well as stoppage of the vehicle, but also to illuminate the number or license plate of the automobile, whereby the device will also serve as a tail-light for the vehicle.

It is also an object to provide certain details and features of construction and combinations tending to increase the general efficiency and desirability of a direction indicator of this particular character.

To these and other useful ends the invention consists in matters hereinafter set forth and claimed.

In the accompanying drawings—

Figure 1 is a diagram showing the application of the invention to an automobile.

Fig. 2 is a rear elevation of a direction indicator embodying the principles of the invention, showing the license or number plate in position below the hollow body which constitutes the indicator.

Fig. 3 is an enlarged transverse vertical section on line 3—3 in Fig. 4.

Fig. 4 is a side elevation of the structure shown in Fig. 2, with a portion thereof broken away for convenience of illustration, and to show the interior construction of the hollow body which contains the electric lamp.

As thus illustrated, the indicator comprises a hollow body having a flat top 1 and a flat bottom 2 and flat sides 3, so that the body is square or rectangular in cross section. Furthermore, it will be seen that these top and bottom and side walls taper gradually toward the front end of the body, so that the body itself tapers forward, and is smaller in cross section near its front end than near its rear end. The sides 3 and arrow-shaped plates 4 of red glass, or other red translucent material, and the top 1 has a plate 5 of red glass or similar material, this plate 5 being also preferably shaped like an arrow, and arranged to point forward. The bottom 2 of the body is provided with a clear or white glass plate 6 to throw a white light downward and thereby illuminate the license or number plate 7 which is supported in any suitable or desired manner below. The rear end of the body is provided with a square or rectangular red glass plate 8 which serves as the tail-light proper. An electric lamp 9, or any other suitable means, is inclosed in the body to illuminate the interior thereof and cause the arrows to show red at night, and to throw a white light downward against the license or number plate.

The supporting means may be of any suitable character, but as shown comprises a transverse pivot 10 by which the body is connected to the upper end of a vertical rod or standard 11, which latter is mounted to turn or rotate in the bearing 12 secured to the rear end of the automobile. A spring 13 is applied to the pivot 10, so that the hollow body is yieldingly held in horizontal position. A cord or wire 14 is arranged in any suitable manner and connected to a bracket 15 on the bottom of the body, so that a forward pull on this cord or wire will tilt the body about the horizontal and transverse axis provided by the pivot 10, causing the rear end of the body to tilt downward and its front end upward, thereby to bring the red glass plate 5 into view, so that those traveling behind will know that the driver of the automobile or vehicle is intending to stop. Preferably, the cord or wire 14 extends forward to the usual or ordinary brake pedal 16 of the automobile, so that the indicator is automatically operated and caused to tilt about its horizontal axis when the brakes of the automobile are applied in the usual manner. Any suitable means can be employed for turning the rod or standard 11 to rotate the indicator about its vertical axis, to indicate that the driver of the automobile is intending to turn to the right or the left. For example, a pulley 17 may be secured to the lower end of the rod 11, and a wire 18 can be applied thereto, this wire extending forward to a device 19, of any suitable character, for operating the belt to turn the indicator about its vertical axis. The device 19, as shown, can be located on the dash of the automobile.

With the foregoing construction, it will be seen that when the hollow body, which constitutes the indicator, is pointing straight ahead, the red glass arrows 4 will not be visible to those behind, inasmuch as the two sides of the body converge toward the forward end of the body, so that a person traveling directly behind, or even a little to either side of the line of travel of the automobile will not see either of the two red arrows. Should the driver of the automobile decide to turn to the right, the device 19 will then be operated to turn the hollow body so that it will point to the right, thus bringing into view the right hand red arrow 4; and vice versa, rotation of the hollow body in the opposite direction will bring into view the other red arrow, and thus indicate the intention of the driver to turn to the left. Should the driver decide to stop, the application of the brakes will automatically tilt the indicator about its pivot 10, as previously explained, so that the red arrow 5 will become visible to those behind, and will point directly upward, thus indicating the stoppage of the automobile. Thus, there is always a red light which serves as a tail-light; for, while the glass plate 8 serves normally as the tail-light, it is also true that when the indicator is turned in either direction, either one or the other of the two red arrows will then serve as a tail-light, in addition to its function of indicating the direction of travel of the automobile. The same electric lamp serves also to illuminate the license or number plate, and the latter can be supported in any suitable or desired manner, directly below the indicator, so that the opening at the bottom of the hollow body will throw the light downward upon the face of the number plate.

As a matter of further and special improvement, the wire 18 can be merely a single wire, so that a pull on this wire will turn the indicator in one direction only; and for the purpose of turning the indicator in the opposite direction, a spring 20 can be applied to the rod 11 and fastened at its upper end to the rod and at its lower end to the bearing 12, so that when the normal pull or tension on the wire 18 is relaxed, this spring will then turn the indicator in a direction opposite to that in which it is turned by the pull on the wire. When this arrangement is employed, it will be understood that one end of the wire 18 is fastened to a point on the circumference of the pulley 17, and that the other end is fastened to the device 19, in any suitable manner, so that when this device is operated in one direction, a pull will be exerted on the wire 18 to turn the direction indicator to the right, for example, and when the device 19 is operated in a manner to release the wire 18, the spring 20 will then immediately turn the indicator around so that it will point to the left; but the wire 18 can be used to turn the direction indicator in either direction, and the spring can be arranged accordingly, depending upon which arrangement will best serve the purpose. Furthermore, this spring 20, it will be seen, yieldingly holds the rod 11 against downward movement, and is thus adapted to form a cushion to support the indicator, so that the latter practically rides on a spring which absorbs the jolts and vibrations while the automobile is traveling along the street. In addition, this rod 11 can be made hollow to contain the cords or other electrical conductors which extend to the lamp in the indicator.

As shown, the hollow body forming the indicator is composed of a light metal frame in which the glass plates are secured in any suitable or desired manner, so that with the exception of this skeleton frame, the entire body is of glass. Obviously, however, the entire body, using the same design and general appearance, can be formed of glass, blown into the proper shape, with the sides and top and rear ends red, but with an opening in the bottom to throw a white light on the number plate. Regardless, however, of the method of construction, one side of the body will provide or form a red arrow, and the other side will provide or form another red arrow, so that the effect will be the same in either case; and while the indicator shown and described involves a red arrow on its top, it will be understood that any suitable means can be employed to indicate stoppage of the vehicle when the indicator is tilted downward at its rear end.

One advantage of the arrangement shown and described is that the device or indicator can be turned to the right or the left, and before the driver reaches the crossing or point where the turn is to be made, so that those traveling behind will have ample notice of the driver's intention. For this reason, therefore, hand operated means which are independent of the steering gear, are preferably employed for this purpose. On the other hand, a driver is often compelled to throw out the clutch or put on the brakes suddenly and without warning, and hence the indication of stoppage is preferably automatic, as in many cases a driver would not have time to control the signal before putting on the brakes.

What I claim as my invention is:—

1. In an automobile direction indicator, the combination of a tail light mounted for rotational movement about a vertically disposed axis to indicate the direction of travel, and for tilting movement about a horizontal axis to indicate stoppage of the vehicle, hand-operated means for controlling said rotational movement, and foot-operated means for controlling said tilting movement.

2. A structure as specified in claim 1, said light having an arrow-shaped body, and said foot-operated means comprising a brake pedal for the vehicle, whereby the front end of said body is automatically tilted to point upward when the vehicle brakes are operated.

3. In an automobile direction indicator, the combination of a metal frame tapered forward and having the general shape of an arrow, means to support said frame at the rear end of the vehicle, means to move the frame about a vertically disposed axis to indicate the direction of travel, red side lights of arrow shape for said frame to show the direction of travel at night, a red rear end light for said frame to serve as a tail light when the frame is pointing straight ahead, means to tilt the frame about a transverse axis, whereby the forward end of the frame will point upward, a red arrow-shaped light for the top of the frame to indicate stoppage at night when the frame points upward, and whereby each of said lights serves as a red tail light when facing rearward, and an electric lamp inclosed in said frame to illuminate said lights.

4. A structure as specified in claim 3, said frame having a white light in the under side thereof, and a license number plate arranged in position to be illuminated by said white light.

5. In an automobile direction indicator, the combination of a hollow body having red arrow-shaped side lights, means to turn the body about a vertically disposed axis, a red rear end light for said body, whereby the body will display only a red light in any position thereof, a white light in the under side of said body, and a license number plate disposed in position to be illuminated by said white light.

6. In an automobile direction indicator, a hollow body containing an electric lamp, means to support said body at the rear end of the vehicle, and means to turn the body to the right or the left to indicate a change in the direction of travel, said body having means whereby it will always display only a red light for either position thereof, the indicator thereby serving also as a tail light in either position.

7. A structure as specified in claim 6, in combination with means for tilting said body about a horizontal axis to indicate stoppage, and means whereby said body will only display a rearwardly facing red light in its tilted position.

8. The combination of a device which is operable in opposite directions to indicate turning of the vehicle to the right or the left, and operable in a different direction to indicate stoppage of the vehicle, whereby one and the same device serves for both purposes, hand operated means to control the device for the first mentioned purpose, and foot operated means to control the device for the second mentioned purpose.

9. The combination of a lamp, means whereby said lamp signals the turning of the vehicle to the right or the left, means whereby the same lamp signals the stoppage of the vehicle, whereby one and the same lamp serves for both purposes, hand operated controlling means for the first mentioned purpose, and foot operated controlling means for the second mentioned purpose.

10. In an automobile direction indicator, the combination of a metal frame tapered forward and having the general shape of an arrow, means to support said frame at the rear end of the vehicle, means to move the frame about a vertically disposed axis to indicate the direction of travel, red side lights of arrow shape for said frame to show the direction of travel at night, a red rear end light for said frame to serve as a tail light when the frame is pointing straight ahead, means to tilt the frame about a transverse axis, whereby the forward end of the frame will point upward, a light for the top of the frame to indicate stoppage at night when the forward end of the frame points upward, and an electric lamp inclosed in said frame to illuminate said lights.

11. A structure as specified in claim 3, in combination with a license number plate arranged directly below said frame in position to be illuminated by said electric lamp.

12. A structure as specified in claim 1, said hand operated means being separate from and independent of the steering gear of the automobile, whereby the indicator can be turned to the right or the left before the direction of travel of the vehicle is changed.

13. In an automobile direction indicator, the combination of a metal frame tapered forward and having the general shape of an arrow, means to support said frame at the rear end of the vehicle, means to move the frame about a vertically disposed axis to indicate the direction of travel, red side lights of arrow shape for said frame to show the direction of travel at night, a red rear end light for said frame to serve as a tail light when the frame is pointing straight ahead, means to tilt the frame about a transverse axis, whereby one end of the frame will point downward, a light for the top of the frame to indicate stoppage at night when one end of the frame points downward, and an electric lamp inclosed in said frame to illuminate said lights.

RALPH RAYMOND McDONNELL.